United States Patent
Dai et al.

(10) Patent No.: US 10,177,943 B2
(45) Date of Patent: *Jan. 8, 2019

(54) CHANNEL QUALITY INDICATOR FOR WIRELINE CHANNEL DEGRADATION DETECTION

(71) Applicant: Marvell World Trade Ltd., St. Michael (BB)

(72) Inventors: Shaoan Dai, San Jose, CA (US); Zhenzhong Gu, San Jose, CA (US); Kok-Wui Cheong, Los Altos, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 15/878,334

(22) Filed: Jan. 23, 2018

(65) Prior Publication Data

US 2018/0152326 A1    May 31, 2018

Related U.S. Application Data

(63) Continuation of application No. 15/380,965, filed on Dec. 15, 2016, now Pat. No. 9,882,747.

(Continued)

(51) Int. Cl.
*H04L 25/03* (2006.01)
*H04B 3/493* (2015.01)
(Continued)

(52) U.S. Cl.
CPC ......... *H04L 25/03057* (2013.01); *H04B 3/23* (2013.01); *H04B 3/235* (2013.01);
(Continued)

(58) Field of Classification Search
CPC . H04B 3/32; H04B 3/487; H04B 3/23; H04B 2/487; H04J 3/0638; H04L 2025/0349; H04L 25/03038; H04L 1/0002; H04L 1/0054; H04L 25/03057; H04L 2025/03617; H04L 2025/03496; H04L 25/03267; H04L 1/0047; H04L 25/085
See application file for complete search history.

(56) References Cited

U.S. PATENT DOCUMENTS 6,038,251 A * 3/2000 Chen .................. H04L 1/0003
                                                    375/222
6,304,598 B1   10/2001 Agazzi et al.
(Continued)

*Primary Examiner* — Khanh C Tran

(57) ABSTRACT

Systems and techniques relating to channel degradation detection for communication systems are described. A described system includes a processor and an interface to transmit signals and receive signals via a channel that includes a cable. The processor can be configured to perform echo cancellation based on echo tap values to remove portions of the transmitted signals that appear as echoes within the received signals, signal equalization based on equalizer tap values, or both. The processor can be configured to determine a channel quality indicator of the channel based on one or more of the echo tap values, one or more of the equalizer tap values, or both. The processor can be configured to generate a warning indication based on the channel quality indicator indicating a degradation of the cable or the channel.

20 Claims, 6 Drawing Sheets

Related U.S. Application Data

(60) Provisional application No. 62/268,073, filed on Dec. 16, 2015.

(51) Int. Cl.
  *H04B 3/23* (2006.01)
  *H04B 17/309* (2015.01)

(52) U.S. Cl.
  CPC ............ *H04B 3/237* (2013.01); *H04B 3/493* (2015.01); *H04B 17/309* (2015.01); *H04L 25/03146* (2013.01); *H04L 25/03885* (2013.01); *H04L 2025/03802* (2013.01)

(56) References Cited

U.S. PATENT DOCUMENTS

| | | |
|---|---|---|
| 6,687,235 B1 | 2/2004 | Chu |
| 7,706,434 B1 | 4/2010 | Farjadrad et al. |
| 8,040,943 B1 | 10/2011 | Babanezhad |
| 2004/0114542 A1 | 6/2004 | Stopler |
| 2004/0252755 A1* | 12/2004 | Jaffe ............... H03H 21/0012 375/233 |
| 2006/0182014 A1 | 8/2006 | Lusky et al. |
| 2008/0080607 A1* | 4/2008 | Shah ............... H04L 25/03019 375/232 |
| 2009/0051821 A1* | 2/2009 | Perlow ............. H04L 25/0224 348/726 |
| 2015/0009867 A1* | 1/2015 | Choi ............... H04W 76/14 370/278 |

* cited by examiner

CHANNEL QUALITY INDICATOR FOR WIRELINE CHANNEL DEGRADATION DETECTION

CROSS REFERENCE TO RELATED APPLICATIONS

This present disclosure is a continuation of and claims priority to U.S. application Ser. No. 15/380,965, filed on Dec. 15, 2016, which claims the benefit of the priority of U.S. Provisional Application Ser. No. 62/268,073, filed Dec. 16, 2015, and entitled "DSP BASED CHANNEL QUALITY INDICATOR." The above-identified applications are incorporated herein by reference in their entirety.

BACKGROUND

This disclosure relates to channel degradation detection for communication systems.

Communication systems can communicate over a wireline channel that includes a cable, connectors, and on-board components. Further, in some systems, transmission and reception occur over the same cable including the same wire pair within the cable (e.g., as can occur in applications including half-duplex or full duplex communication systems). As such, a communication system can use echo cancellation to remove echoes of a transmitted signal from a received signal. A communication system can use equalization on a received signal to flatten a frequency response of the channel and remove time-domain Inter-Symbol Interference (ISI).

In some implementations, communication systems are based on the wireline Ethernet standard as defined by the Institute of Electrical and Electronics Engineers (IEEE) 802.3. In some implementations, communication systems are based on the IEEE 802.3bp standard (1000BASE-T1) for gigabit Ethernet over a single twisted pair for automotive and industrial environments. In some implementations, communication systems are based on the IEEE 802.3bw standard (100BASE-T1) for 100 Mbit/s Ethernet over a single twisted pair for automotive applications. In some implementations, Ethernet based communication systems include a Physical Coding Sublayer (PCS) for auto-negotiation and low-level encoding; a Physical Medium Attachment sublayer (PMA) for framing, octet synchronization, octet detection, scrambling, and descrambling; and a Physical Medium Dependent sublayer (PMD) that relates to the physical characteristics of signal transmission and reception.

SUMMARY

The present disclosure includes systems and techniques for channel degradation detection for communication systems. According to an aspect of the present disclosure, a system for channel degradation detection includes an interface to transmit signals and receive signals via a channel that includes a cable; an echo canceller coupled with the interface, the echo canceller to perform echo cancellation based on echo tap values to remove portions of the transmitted signals that appear as echoes within the received signals; an equalizer coupled with the interface, the equalizer to perform signal equalization based on equalizer tap values, the equalizer tap values being determined based on at least a portion of the received signals to adjust an impulse response of the channel and reduce inter-symbol interference within the received signals; and circuitry configured to determine a return loss channel quality indicator of the channel based on the echo tap values, determine an insertion loss channel quality indicator of the channel based on the equalizer tap values, or both.

This and other implementations can include one or more of the following features. In some implementations, the circuitry is configured to generate a warning indication based on the return loss channel quality indicator or the insertion loss channel quality indicator exceeding a threshold, the warning indication indicating a degradation of the cable or the channel. In some implementations, the circuitry is configured to determine the return loss channel quality indicator based on a summation of squared versions of the echo tap values. In some implementations, the circuitry is configured to determine the return loss channel quality indicator based on a summation of absolute value versions of the echo tap values. In some implementations, the circuitry is configured to determine the insertion loss channel quality indicator based on a summation of squared versions of the equalizer tap values. In some implementations, the circuitry is configured to determine the insertion loss channel quality indicator based on a summation of absolute value versions of the equalizer tap values. In some implementations, the equalizer includes a feedforward equalizer (FFE) and a decision-feedback equalizer (DFE). In some implementations, the circuitry is configured to adjust channel compensation from the FFE before a determination of the insertion loss channel quality indicator. In some implementations, the insertion loss channel quality indicator is based on a main tap value associated with the DFE and a channel gain value. In some implementations, the return loss channel quality indicator is mapped to a k-bit value, and wherein the insertion loss channel quality indicator is mapped to a k-bit value.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, one or more disclosed embodiments can be implemented in various systems and apparatus, including, but not limited to, a special purpose data processing apparatus (e.g., a remote environment monitor, a router, a switch, a computer system component, a medium access unit), an automotive communication system, a mobile computer, a digital camera, a general purpose data processing apparatus such as a computer, or combinations of these.

Particular configurations of the technology described in this disclosure can be implemented so as to realize one or more of the following potential advantages. A described technology can warn about potential channel degradation before the degradation impacts system performance. A described technology can be implemented within low-cost systems, low-power systems, or both types of systems.

Details of one or more implementations are set forth in the accompanying drawings and the description below. Other

DRAWING DESCRIPTIONS

Like reference symbols in the various drawings indicate like elements.

DETAILED DESCRIPTION

High speed communication is an important component in high-tech automotive applications, including cars and boats, and industrial sectors. With increased deployment of automotive Ethernet, advanced and smarter diagnosis of the high speed communication system is beneficial for system reliability. Further, automotive manufacturers and Original Equipment Manufacturers (OEMs) may require higher reliability performance to deal with harsh environments for a communication channel such as those that exist within a car.

This disclosure presents techniques and systems to assess channel quality and warn about current or potential channel degradation that impacts or will impact reliability, throughput, or both. In some implementations, a communication device, coupled with another device to form a wireline channel, computes a Channel Quality Indicator (CQI) which supplies reliability information about the channel. The CQI can be used for the diagnosis, maintenance, and service of the communication system's reliability and aging issues. The channel can include one or more cables, connectors, and on-board components. The device can compute a CQI of Insertion Loss (IL-CQI), a CQI of Return Loss (RL-CQI), or both. The insertion loss reflects channel attenuation and ISI. The return loss reflects echoes of a transmitted signal within received signals. Channel degradation, over time, typically increases insertion loss, return loss, or both. In some implementations, a device uses circuitry such as a processor, e.g., a digital signal processor (DSP), to compute CQIs such as IL-CQI, RL-CQI or both. In some implementations, a device uses circuitry such as an application-specific integrated circuit (ASIC) or specialized logic device(s) to compute CQIs. These CQI-based solutions can be readily used in IEEE Ethernet standards such as 802.3bp and 802.3bw. Further, in the automotive maintenance and system auto-diagnosis, the requirement for system aging and failure prediction is important for automotive safety and failure diagnosis at service time. Also, simple implementation and less computing power are design factors for supporting a wide range of applications.

Figure 1:
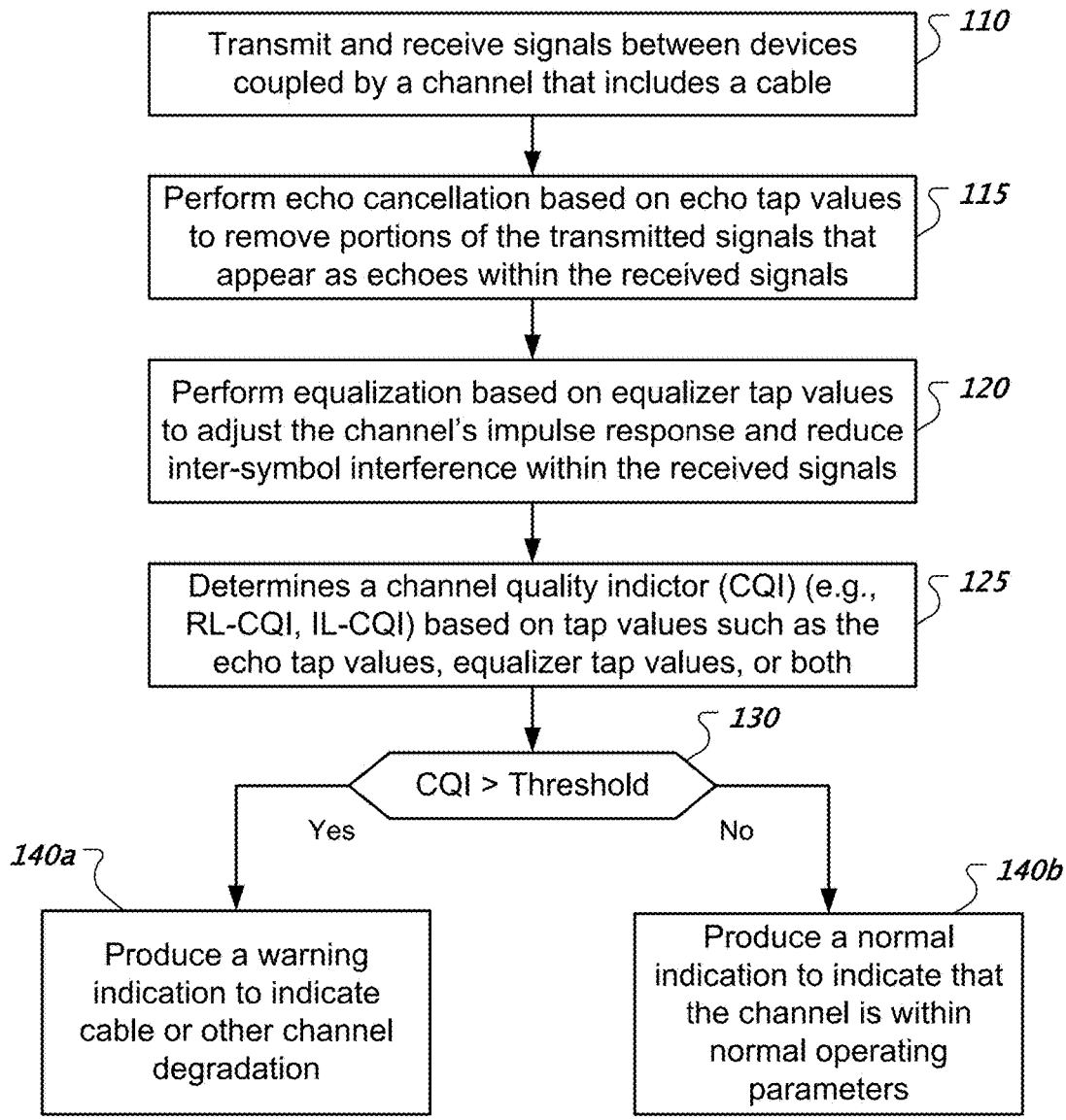
FIG. 1 shows a flowchart of an example of a process that includes echo cancellation, equalization, and channel degradation detection based on tap values used for echo cancellation, equalization, or both.

FIG. 1 shows a flowchart of an example of a process that includes echo cancellation, equalization, and channel degradation detection based on tap values used for echo cancellation, equalization, or both. At 110, the process transmits and receives signals between devices coupled by a channel that includes a cable. For example, a controller device can request data from a sensor device or send a command to another device to cause an action to occur, e.g., start engine. In some implementations, the process operates a transceiver to transmit and receive signals. At 115, the process performs echo cancellation based on echo tap values to remove portions of the transmitted signals that appear as echoes within the received signals. In some implementations, the transmitted signals are provided to an echo canceller which is configured to store the last N signal values and apply N echo tap values respectively to the stored signal values to generate an output signal that reduces or eliminates echoes within the received signals.

At 120, the process performs equalization based on equalizer tap values to adjust the channel's impulse response and reduce inter-symbol interference within the received signals. The process can use one or more equalizers such as a feedforward equalizer (FFE) or a decision-feedback equalizer (DFE). In some implementations, the equalizers are located after echo cancellation, and accordingly, operate on an echo cancelled version of a received signal. In some implementations, an equalizer is configured to store M signal values that represent currently or previously received signal values. In some implementations, an equalizer is configured to store M signal values that represent the output values of a slicer that makes a decision as to whether a portion of a received signal represents a one or a zero. In some implementations, the process uses an adaptation technique such as a Least-Mean-Square (LMS) technique to determine the equalizer tap values. In some implementations, the process causes the devices to exchange a training sequence in order to measure ISI within the channel. In some implementations, the process executes the training sequence, adaptation, or both at predetermined intervals.

At 125, the process determines a CQI, e.g., RL-CQI, IL-CQI, or both, based on tap values such as the echo tap values, equalizer tap values, or both. An example of a process for determining a CQI based on echo tap values is described in connection with FIG. 4. An example of a process for determining a CQI based on equalizer tap values is described in connection with FIG. 5. At 130, the process determines whether the CQI exceeds a threshold. In some implementations, the process uses a threshold that is set based on a dB increase, e.g., 1 dB, 2 dB, or 3 dB, over an initial calibration value such as a RL-CQI or IL-CQI that is determined when the channel is not degraded, e.g., at or around the time of manufacture. In some implementations, the process uses a threshold that is set based on a predetermined value, which can be determined before manufacture.

If exceeded, the process at 140a, produces a warning indication to indicate cable or other channel degradation. The warning indication can trigger a user interface warning, e.g., a check system light akin to a car's check engine light. If not exceeded, the process at 140b, produces a normal indication to indicate that the channel is within normal operating parameters. In some implementations, a normal indication either maintains a check system light in the off-state or turns off the light. In some implementations, an application programming interface (API) can be used to provide access to channel quality and warning information.

Figure 2:
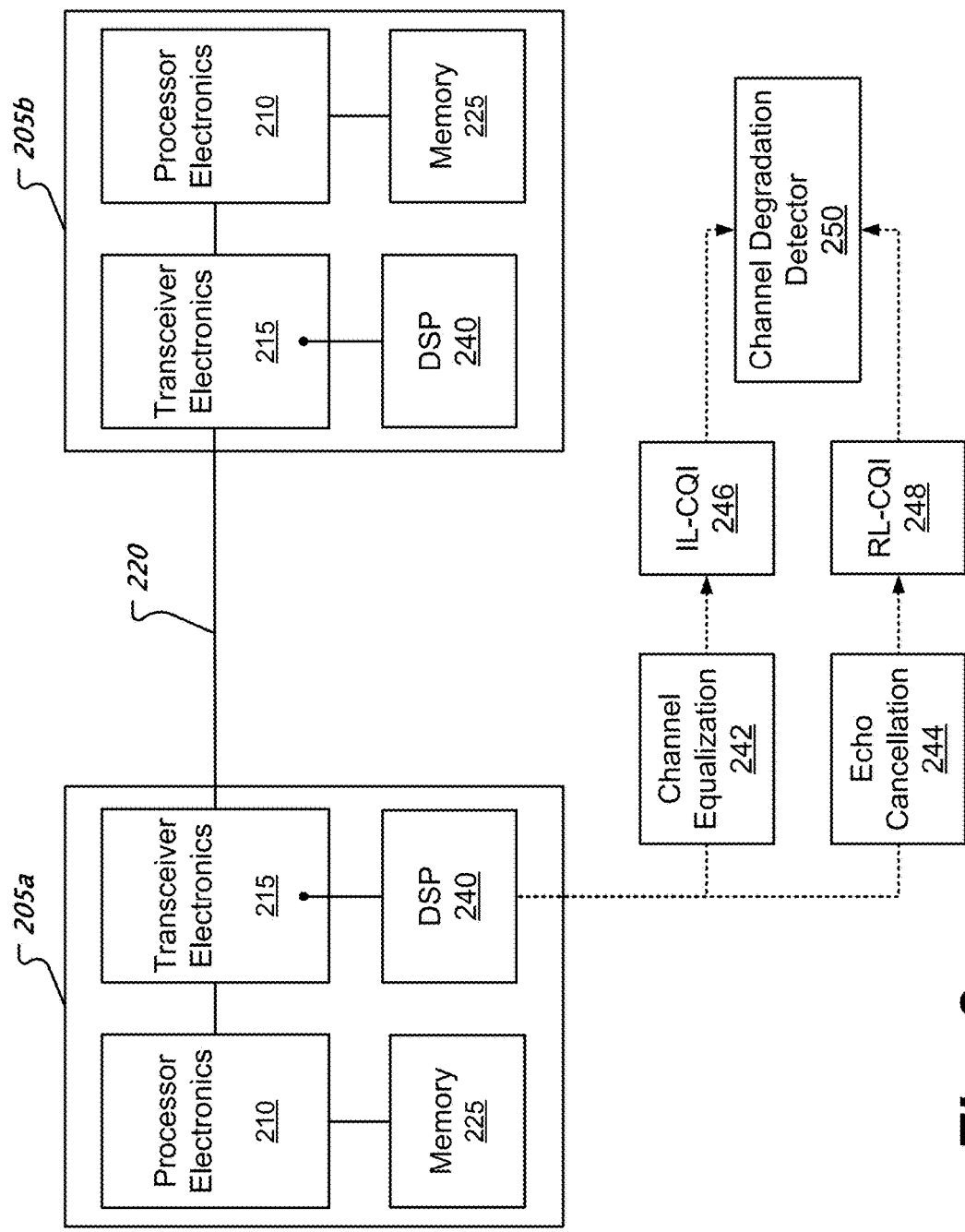
FIG. 2 shows a block diagram of two communication devices coupled via a wireline channel within a communication system.

FIG. 2 shows a block diagram of two communication devices 205a, 205b coupled via a wireline channel 220 within a communication system. The devices 205a-b include processor electronics 210 such as one or more processors that implement methods effecting the techniques presented in this disclosure. Each of the devices 205a-b includes a memory 225 configured to store information such as data, instructions, or both. In some implementations, the memory 225 includes instructions for processor electronics 210, DSP 240, or both. The devices 205a-b include transceiver electronics 215 to transmit and receive signals over a cable within the channel 220. In some implementations, the channel 220 includes multiple wire pairs.

In this example, signal transmission and reception occur on the same wires, and accordingly, echoes of transmitted signals can appear in received signals. The transceiver electronics 215 includes a DSP 240 configured to perform echo cancellation 244 to remove echoes of a transmitted signal that appear within received signals. The DSP 240 is further configured to perform channel equalization 242 on signals received over the channel 220. In some implementations, the DSP 240 determines an IL-CQI 246 based on coefficients used for channel equalization 242. In some implementations, the DSP 240 determines a RL-CQI 248 based on coefficients used for echo cancellation 244. A channel degradation detector 250 compares the IL-CQI value and RL-CQI value to respective IL and RL thresholds. If any of the values exceed their respective thresholds, the channel degradation detector 250 can trigger a warning, such as activating a car's service required light or sending a service required message to a server. In some implementations, processor electronics 210 are configured to perform the actions of the channel degradation detector 250. In some implementations, processor electronics 210 forward information from the channel degradation detector 250 to a vehicle's On-Board Diagnostic (OBD) system.

Figure 3:
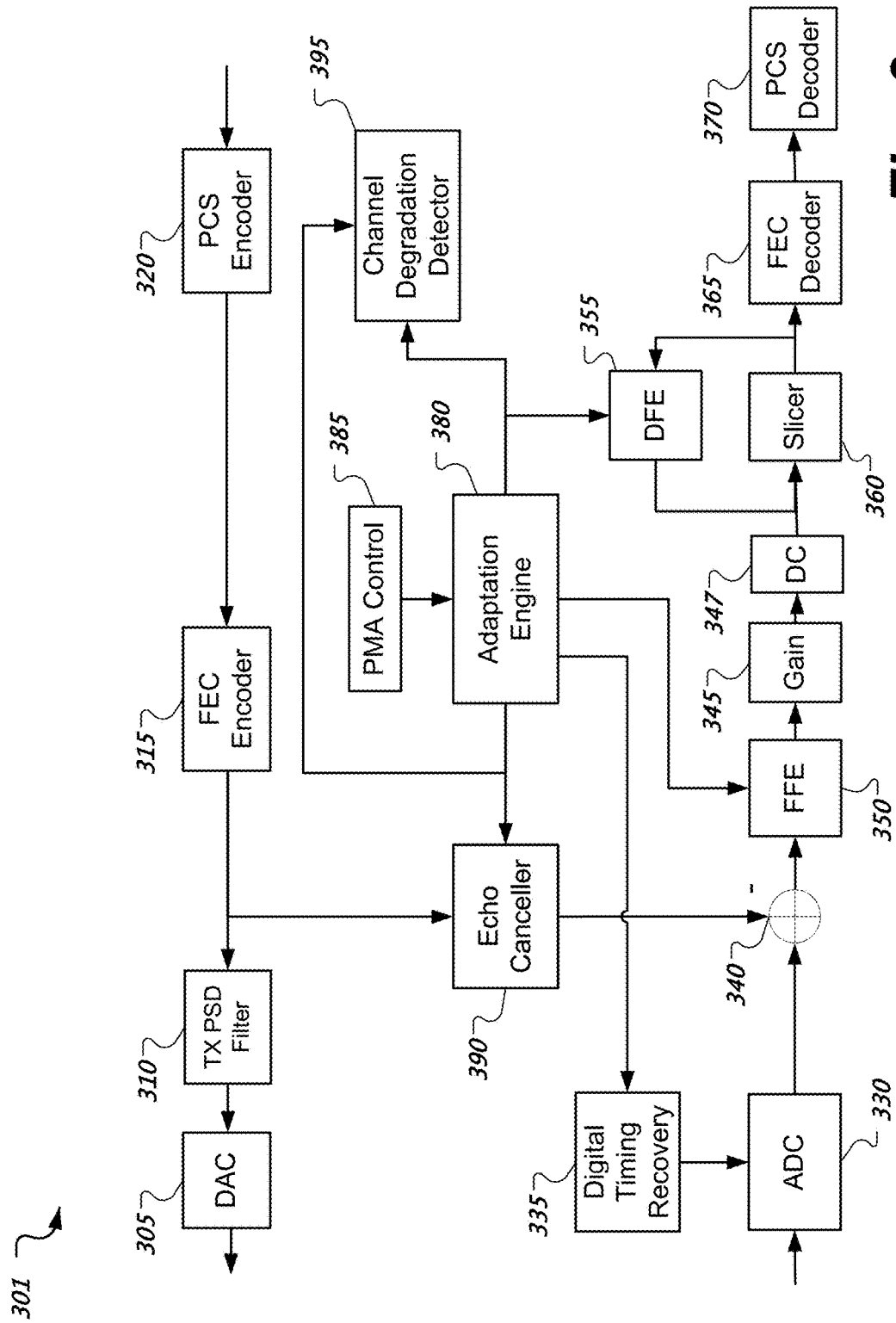
FIG. 3 shows a block diagram of an example of a device that includes an echo canceller and equalizers.

FIG. 3 shows a block diagram of an example of a device 301 that includes an echo canceller 390 and equalizers 350, 355. A transmit pathway of the device 301 includes a digital-to-analog converter (DAC) 305, transmit (TX) power spectral density (PSD) filter 310, forward error correction (FEC) encoder 315, and a Physical Coding Sublayer (PCS) encoder 320. A receive pathway of the device 301 includes an analog-to-digital convertor (ADC) 330, digital timing recovery 335, echo canceller 390, summer 340, feedforward equalizer (FFE) 350, gain (G) determination 345, DC (direct current) offset correction 347, decision-feedback equalizer (DFE) 355, slicer 360, FEC decoder 365, PCS decoder 370, adaptation engine 380, and PMA control 385. In some implementations, the device 301 is coupled with or includes a channel degradation detector 395. The device 301 performs echo cancellation via echo canceller 390 and summer 340.

The device 301 includes components such as echo canceller 390 and summer 340 to provide compensation for echoes within the channel. The adaptation engine 380 can determine echo tap values for the echo canceller 390. The echo canceller 390 uses the echo tap values and transmit values from the FEC encoder 315 on the transmit path to produce a cancellation signal. A negated version of the cancellation signal is summed via summer 340 with the sampled signal produced by the ADC 330.

The echo tap values used by the echo canceller 390 reflect the return loss magnitude. A channel degradation detector 395 can map echo tap values into a RL-CQI. The power of the time domain reflection is equal to the total frequency return loss power. Hence, RL-CQI determination can be performed in either the time or frequency domain. By calculating a sum of echo tap power values or a sum of absolute values of the echo taps, the device 301 can estimate the RL-CQI and the receiver dynamic range by one or more reflections, e.g., echoes, caused by one or more channel components, e.g., cable, connectors, in a system containing the device 301. In some implementations, information such as the RL-CQI is used to evaluate how much margin is left for the system to operate correctly in different environments.

The device 301 includes components such as FFE 350, DFE 355, and gain determination 345 to provide compensation for the channel's insertion loss. The echo cancelled signal is provided to the FFE 350 and gain determination 345. Further, the device 301 corrects the DC offset via DC offset correction 347 before the signal is provided to the slicer 360. In some implementations, a Narrowband Interference (NBI) noise cancellation block includes the FFE 350 and the DFE 355. The DFE 355 operates on the output of the slicer 360 and produces a signal that is summed with the output of DC offset correction 347. The adaptation engine 380 can determine tap values for the FFE 350 and the DFE 355 via an adaptation technique such as LMS. Other techniques are possible. The FFE 350 tap values can include one or more precursor values, a main tap, and one or more post-cursor values. The DFE 355 tap values can include one or more post-cursor values.

The channel degradation detector 395 can map equalizer tap values used by an equalizer 350, 355 into an IL-CQI. While the number of taps for the equalizers 350, 355 can be increased to provide additional compensation, a corresponding increase in computing power is typically required to perform equalization and determine equalizer coefficients. However, such increased computing power may not be available for low power or low cost systems. Thus, when channel components begin to degrade, a low power or a low cost system may not be able to fully compensate for the degradation.

The integral of signal power in the time domain is equal to the integral of signal power in the frequency domain. When there is no insertion loss, only the main tap of the FFE 350 is required, the gain is zero, and the DFE 355 tap values are zeros. When the ideal signal passes through the channel to device 301, the channel's output includes the attenuated main tap and inter-symbol interference. If the tap values of the FFE 350, except for the main tap, are forced zeros and the channel is equalized by DFE 350 and gain determination 345, the signal power in the time domain is the gain G times the sum of the main tap power and the DFE tap power (e.g., ISI power). ISI power itself reflects the condition of the channel. In order to be correctly equalized by the DFE 355, the precursors of the FFE 350 and a few post-cursors of the FFE 350 may be required to establish good equalization by the DFE 355.

In some implementations, data symbols are converted into one-channel PAM3 symbols (a form of pulse amplitude modulation) at 750M symbols per second. A Digital Timing Loop (DTL) of the device 301 includes digital timing recovery 335 to control the sampling phase of the ADC 330 based on the data error.

Figure 4:
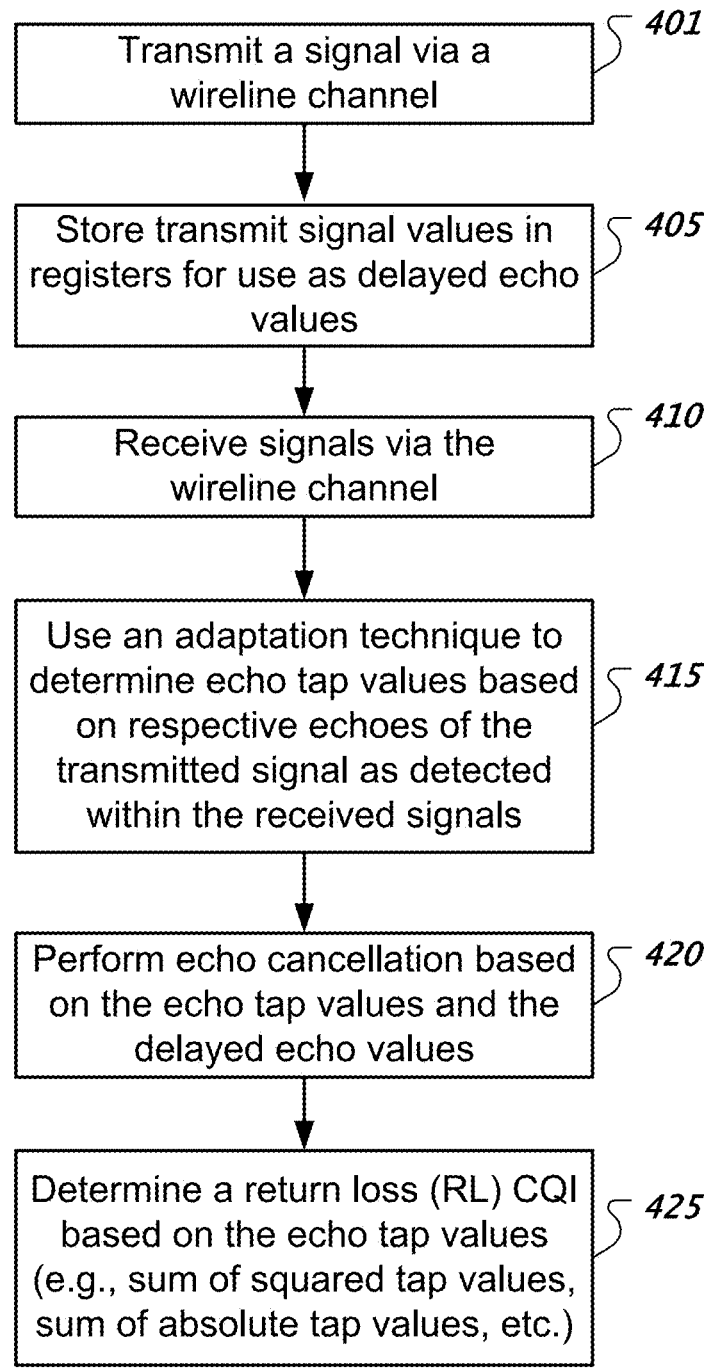
FIG. 4 shows a flowchart of an example of a process that determines a return loss channel quality indictor via echo cancellation.

FIG. 4 shows a flowchart of an example of a process that determines a return loss channel quality indictor via echo cancellation. At 401, the process transmits a signal via a wireline channel. At 405, the process stores transmit signal values in registers for use as delayed echo values. In some implementations, the stored values reflect pre-filtered versions of the transmit signals.

At 410, the process receives signals via the wireline channel. In this example, transmitting and receiving signals occur via the same cable within the wireline channel. Echo triggers, such as impedance mismatches and aging of channel components, cause echoes to occur reflecting a device's transmitted signal back into the device's received signal. In some implementations, transmitting and receiving signals are based on nominal packet exchanges between devices within a system. In some implementations, a packet exchange includes a training sequence used to determine the echo characteristics of the channel.

At 415, the process uses an adaption technique to determine echo tap values based on respective echoes of the transmitted signal as detected within the received signals. The echo tap values can be adapted to make the residue after the echo cancellation minimum. In some implementations, the number of echo tap values is determined by the maximum cable length.

At 420, the process performs echo cancellation based on the echo tap values and the delayed echo values. In some implementations, the process performs echo cancellation based on:

$$E = \sum_{i=1}^{p} echo_i D^i$$

where p represents the number of echo taps within an echo canceller, $echo_i$ represents the $i^{th}$ echo tap value which corresponds to the $i^{th}$ echo magnitude, and $D^i$ represents the $i^{th}$ delayed echo value. Ideally, if there are no echoes, all the echo tap values would be zero. However, since echoes occur and may worsen over time as channel components such as a cable deteriorate, the echo tap values are or become non-zero.

At 425, the process determines a RL-CQI based on the echo tap values, e.g., sum of squared tap values, sum of absolute tap values, etc. In some implementations, the RL-CQI is expressed as $$RL_{CQI} = echo_1^2 + \ldots + echo_p^2.$$

In some implementations, the RL-CQI is expressed as $$RL_{CQI} = |echo_1| + \ldots + |echo_p|.$$

Other expressions for RL-CQI are possible. In some implementations, RL-CQI determination at 425 is performed at periodic intervals, whereas echo cancellation at 420 is continuous insofar as there is a continuous stream of transmitted signals to cancel. In some implementations, the RL-CQI is quantized and mapped to a k-bit value, such as a 4-bit value, however other values for high dynamic range or high precision are possible.

Figure 5:
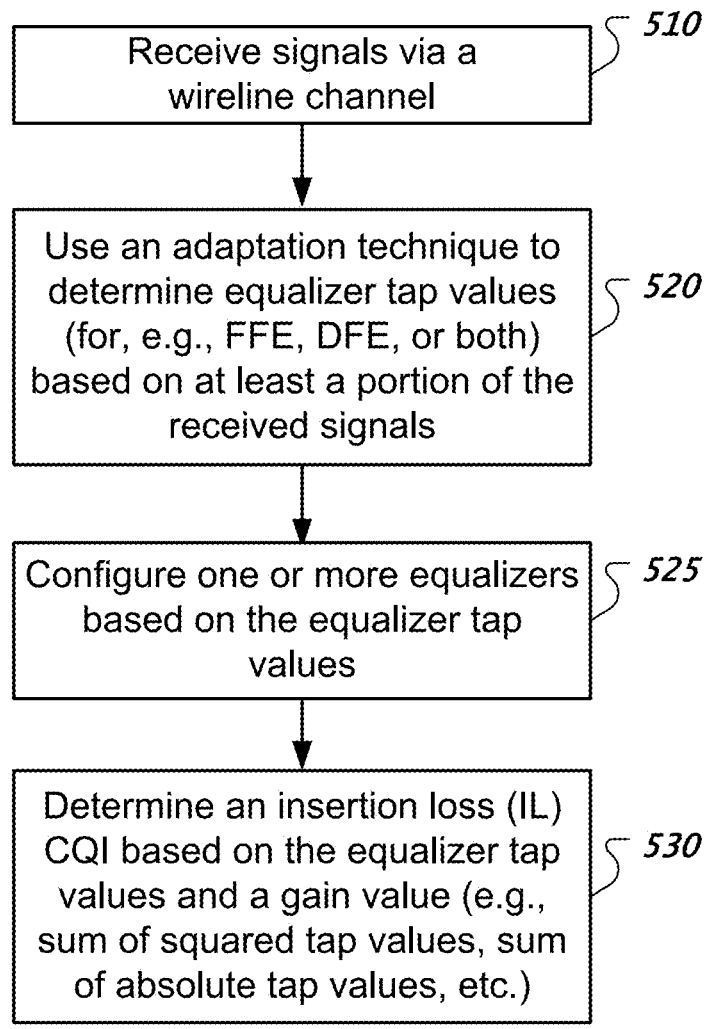
FIG. 5 shows a flowchart of an example of a process that determines an insertion loss channel quality indictor via channel equalization.

FIG. 5 shows a flowchart of an example of a process that determines an insertion loss channel quality indictor via channel equalization. At 510, the process receives signals via a wireline channel. In some implementations, the signals include training symbols that are used for determining equalizer tap values. At 520, the process uses an adaptation technique such as LMS to determine equalizer tap values, such as FFE tap values, DFE tap values, or both, based on at least a portion of the received signals to adjust an impulse response of the channel and reduce inter-symbol interference within the received signals. In some implementations, the process performs echo cancellation on the received signals before determining equalizer tap values.

At 525, the process configures one or more equalizers based on the equalizer tap values. In some implementations, the process loads the tap values into an equalizer's tap registers. In some implementations, the process performs FFE based on the following equation:

$$\sum_{i=-m}^{n} w_i D^i$$

where $w_i$ represents the $i^{th}$ FFE tap value, $D^i$ represents the $i^{th}$ delay value, index values of [−m, −1] correspond to precursor values, [1, n] represent post-cursor values, and 0 is the main tap value. In some implementations, the process retrieves the delay values for FFE from a bank of registers that store received signal values. In some implementations, the process performs DFE based on the following equation:

$$\sum_{i=1}^{l} f_i D^i$$

where $f_i$ represents the $i^{th}$ DFE tap value, $D^i$ represents the $i^{th}$ delay value, and l is the number of DFE taps. In some implementations, the process retrieves the delay values for DFE from a bank of registers that store the output values of a slicer, e.g., see slicer 360 of FIG. 3, that makes bit decisions based on an input and a decision threshold. In some implementations, the number of FFE and DFE taps is determined by the cable insertion loss.

At 530, the process determines an IL-CQI based on the equalizer tap values and a gain value. The process can determine an IL-CQI based on a technique such as a sum of squared tap values or a sum of absolute tap values. In some implementations, the IL-CQI is expressed as any one of the following:

$$IL_{CQI} = G \times (1 + f_1^2 + \ldots + f_l^2)$$

$$IL_{CQI} = G \times (f_1^2 + \ldots + f_l^2)$$

$$IL_{CQI} = G \times (1 + |f_1| + \ldots + |f_l|)$$

where G represents a gain. The gain can reflect a signal attenuation within the channel. Note that non-zero values of precursor or post-cursor FFE taps may induce an estimation error, but the precursor power can be neglected. In some implementations, the process calculates the normalized and relative power, and the post-cursor power of the FFE can be ignored for the channel quality comparison once calibrated. In some implementations, the main tap of the DFE is used for a real-time IL-CQI determination as follows: $IL_{CQI} = G \times 1$. In some implementations, IL-CQI determination includes adjusting, e.g., shaping or limiting, the FFE compensation and using DFE, main tap, and G to estimate the IL of the channel. In some implementations, the IL-CQI is quantized and mapped to an k-bit value, such as a 4-bit value, however other values for n are possible. In some implementations, the process computes $IL_{CQI} = G \times 1$ after the startup training is performed, and the process computes $IL_{CQI} = G \times (1 + f_1^2 + \ldots + f_l^2)$ in a stage of startup training or in a test mode.

Figure 6:
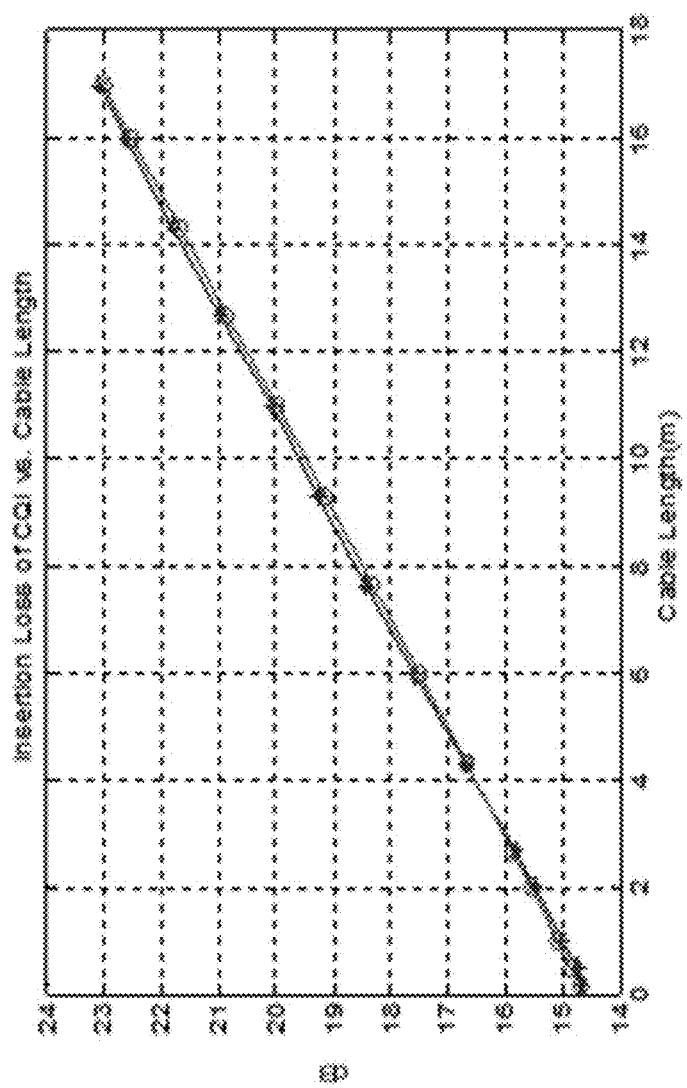
FIG. 6 shows a graph of an example of insertion loss channel quality indicator estimation for different cable lengths.

FIG. 6 shows a graph of an example of insertion loss channel quality indicator estimation for different cable lengths. The graph 601 plots dB values corresponding to $IL_{CQI} = G \times (1 + f_1^2 + \ldots + f_l^2)$ for a range of cable lengths. The graph 601 reflects an increase in channel attenuation based on an increase in cable length. While the determination of the IL-CQI is agnostic to cable length, a calibration process can determine a base-line threshold for a nominal IL-CQI when a system is initially manufactured. In some implementations, when the IL-CQI exceeds a predetermined percentage of the base-line threshold (e.g., 1 dB, 2 dB, 3 dB, etc.) then a channel degradation detector indicates a warning.

In some implementations, a technique includes transmitting signals via a channel that includes a cable; receiving signals via the channel; performing echo cancellation based on echo tap values to remove portions of the transmitted signals that appear as echoes within the received signals; determining equalizer tap values based on at least a portion of the received signals to adjust an impulse response of the channel and reduce inter-symbol interference within the received signals; performing signal equalization based on the equalizer tap values; and determining a channel quality indicator of the channel. In some implementations, determining the channel quality indicator includes determining a return loss channel quality indicator of the channel based on the echo tap values, determining an insertion loss channel quality indicator of the channel based on the equalizer tap values, or both.

The technique can include generating a warning indication based on the return loss channel quality indicator or the insertion loss channel quality indicator exceeding a threshold, the warning indication indicating a degradation of the cable or the channel. The technique can include determining the return loss channel quality indicator based on a summation of squared versions of the echo tap values. The technique can include determining the return loss channel quality indicator based on a summation of absolute value versions of the echo tap values. The technique can include determining the insertion loss channel quality indicator based on a summation of squared versions of the equalizer tap values. The technique can include determining the insertion loss channel quality indicator based on a summation of absolute value versions of the equalizer tap values. Performing the signal equalization can include using a FFE and a DFE. The technique can include adjusting channel compensation from the FFE before a determination of the insertion loss channel quality indicator. In some implementations, the insertion loss channel quality indicator is based on a main tap value associated with the DFE and a channel gain value. In some implementations, the return loss channel quality indicator is mapped to a k-bit value. In some implementations, the insertion loss channel quality indicator is mapped to a k-bit value.

In some implementations, a communication system includes multiple devices include a first device and a second device communicatively coupled with the first device via a channel that includes a cable. One or more of these devices can include an interface to transmit signals and receive signals via the channel and a processor. The processor can be configured to perform echo cancellation based on echo tap values to remove portions of the transmitted signals that appear as echoes within the received signals, determine equalizer tap values based on at least a portion of the received signals to adjust an impulse response of the channel and reduce inter-symbol interference within the received signals, perform signal equalization based on the equalizer tap values, and determine a return loss channel quality indicator of the channel based on the echo tap values, determine an insertion loss channel quality indicator of the channel based on the equalizer tap values, or both. The system can include circuitry to generate a warning indication based on the return loss channel quality indicator or the insertion loss channel quality indicator exceeding a threshold, the warning indication indicating a degradation of the cable or the channel. In some implementations, the processor is configured to determine the return loss channel quality indicator based on a summation of squared versions of the echo tap values or a summation of absolute value versions of the echo tap values. In some implementations, the processor is configured to determine the insertion loss channel quality indicator based on a summation of squared versions of the equalizer tap values or a summation of absolute value versions of the equalizer tap values.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

What is claimed is:

1. An apparatus comprising:
an interface to transmit signals and receive signals via a channel that includes a cable; and
a processor coupled with the interface, wherein the processor is configured to perform i) echo cancellation based on echo tap values to remove portions of the transmitted signals that appear as echoes within the received signals, ii) signal equalization based on equalizer tap values, the equalizer tap values being determined based on at least a portion of the received signals to adjust an impulse response of the channel and reduce inter-symbol interference within the received signals, or iii) both the echo cancellation and the signal equalization,
wherein the processor is configured to determine a channel quality indicator of the channel based on one or more of the echo tap values, one or more of the equalizer tap values, or both one or more of the echo tap values and one or more of the equalizer tap values, and wherein the processor is configured to generate a warning indication based on the channel quality indicator indicating a degradation of the cable or the channel.

2. The apparatus of claim 1, wherein the channel quality indicator comprises a return loss channel quality indicator of the channel that is based on one or more of the echo tap values, an insertion loss channel quality indicator of the channel that is based on one or more of the equalizer tap values, or both the return loss channel quality indicator and the insertion loss channel quality indicator.

3. The apparatus of claim 2, wherein the processor is configured to generate the warning indication based on the return loss channel quality indicator exceeding a first threshold, the insertion loss channel quality indicator exceeding a second threshold, or both.

4. The apparatus of claim 2, wherein the processor is configured to determine the return loss channel quality indicator based on a summation of absolute value versions or squared versions of the echo tap values.

5. The apparatus of claim 2, wherein the processor is configured to determine the insertion loss channel quality indicator based on a summation of absolute value versions or squared versions of the equalizer tap values.

6. The apparatus of claim 2, wherein the return loss channel quality indicator is mapped to a k-bit value, and wherein the insertion loss channel quality indicator is mapped to a k-bit value.

7. The apparatus of claim 1, wherein the channel quality indicator comprises an insertion loss channel quality indicator of the channel that is based on one or more of the equalizer tap values, wherein the processor is configured to perform the signal equalization, wherein the signal equalization comprises feedforward equalization and decision-feedback equalization, and wherein the processor is configured to adjust channel compensation from the feedforward equalization before a determination of the insertion loss channel quality indicator.

8. The apparatus of claim 7, wherein the insertion loss channel quality indicator is based on a main tap value associated with the decision-feedback equalization and a channel gain value.

9. A method comprising:
transmitting signals via a channel that includes a cable;
receiving signals via the channel;
performing i) echo cancellation based on echo tap values to remove portions of the transmitted signals that appear as echoes within the received signals, ii) signal equalization based on equalizer tap values, the equalizer tap values being determined based on at least a portion of the received signals to adjust an impulse response of the channel and reduce inter-symbol interference within the received signals, or iii) both the echo cancellation and the signal equalization;
determining a channel quality indicator of the channel based on one or more of the echo tap values, one or more of the equalizer tap values, or both one or more of the echo tap values and one or more of the equalizer tap values; and
generating a warning indication based on the channel quality indicator indicating a degradation of the cable or the channel.

10. The method of claim 9, wherein determining the channel quality indicator comprises determining a return loss channel quality indicator of the channel based on one or more of the echo tap values, determining an insertion loss channel quality indicator of the channel based on one or more of the equalizer tap values, or both.

11. The method of claim 10, wherein generating the warning indication comprises generating the warning indication based on the return loss channel quality indicator exceeding a first threshold, the insertion loss channel quality indicator exceeding a second threshold, or both.

12. The method of claim 10, wherein determining the return loss channel quality indicator comprises determining the return loss channel quality indicator based on a summation of absolute value versions or squared versions of the echo tap values.

13. The method of claim 10, wherein determining the insertion loss channel quality indicator comprises determining the insertion loss channel quality indicator based on a summation of absolute value versions or squared versions of the equalizer tap values.

14. The method of claim 9, wherein determining the channel quality indicator comprises determining an insertion loss channel quality indicator of the channel based on one or more of the equalizer tap values, wherein the signal equalization comprises feedforward equalization and decision-feedback equalization, and wherein the method comprises adjusting channel compensation from the feedforward equalization before a determination of the insertion loss channel quality indicator.

15. The method of claim 14, wherein the insertion loss channel quality indicator is based on a main tap value associated with the decision-feedback equalization and a channel gain value.

16. A system comprising:
a first device of a car, the first device comprising an interface to transmit signals and receive signals via a channel that includes a cable that is subjected to an automotive environment of the car, and a processor coupled with the interface; and
a second device of the car, the second device being communicatively coupled with the first device via the cable, wherein the processor is configured to perform i) echo cancellation based on echo tap values to remove portions of the transmitted signals that appear as echoes within the received signals, ii) signal equalization based on equalizer tap values, the equalizer tap values being determined based on at least a portion of the received signals to adjust an impulse response of the channel and reduce inter-symbol interference within the received signals, or iii) both the echo cancellation and the signal equalization, wherein the processor is configured to determine a channel quality indicator of the channel based on one or more of the echo tap values, one or more of the equalizer tap values, or both one or more of the echo tap values and one or more of the equalizer tap values, and wherein the processor is configured to detect a degradation of the cable or the channel over time resulting from being subjected to the automotive environment of the car based on the channel quality indicator.

17. The system of claim 16, wherein the channel quality indicator comprises a return loss channel quality indicator of the channel that is based on one or more of the echo tap values, an insertion loss channel quality indicator of the channel that is based on one or more of the equalizer tap values, or both the return loss channel quality indicator and the insertion loss channel quality indicator.

18. The system of claim 17, wherein the processor is configured to determine the return loss channel quality indicator based on a summation of absolute or squared versions of the echo tap values, and wherein the processor is configured to determine the insertion loss channel quality indicator based on a summation of absolute or squared versions of the equalizer tap values.

19. The system of claim 17, wherein the processor is configured to generate a warning indication based on the return loss channel quality indicator exceeding a first threshold, the insertion loss channel quality indicator exceeding a second threshold, or both.

20. The system of claim 19, comprising:
on-board diagnostic system of the car,
wherein the first device is configured to forward the return loss channel quality indicator to the on-board diagnostic system, forward the insertion loss channel quality indicator to the on-board diagnostic system, or both.

\* \* \* \* \*